(12) United States Patent
Bruderek et al.

(10) Patent No.: US 10,983,764 B2
(45) Date of Patent: Apr. 20, 2021

(54) METHOD OF PROVIDING APPLICATION-ORIENTED SOFTWARE AND COMPUTER SYSTEM

(71) Applicant: Fujitsu Technology Solutions Intellectual Property GmbH, Munich (DE)

(72) Inventors: Timo Bruderek, Munich (DE); Jürgen Atzkern, Munich (DE)

(73) Assignee: Fujitsu Technology Solutions Intellectual Property GmbH, Munich (DE)

(*) Notice: Subject to any disclaimer, the term of this patent is extended or adjusted under 35 U.S.C. 154(b) by 30 days.

(21) Appl. No.: 16/412,601

(22) Filed: May 15, 2019

(65) Prior Publication Data
US 2019/0361683 A1  Nov. 28, 2019

(30) Foreign Application Priority Data
May 23, 2018  (DE) .................... 10 2018 112 364.7

(51) Int. Cl.
*G06F 9/44* (2018.01)
*G06F 8/36* (2018.01)
*G06F 9/455* (2018.01)

(52) U.S. Cl.
CPC ............ *G06F 8/36* (2013.01); *G06F 9/45529* (2013.01)

(58) Field of Classification Search
CPC ........... G06F 8/36; G06F 9/45529; G06F 8/40
USPC ........................................................ 717/107
See application file for complete search history.

(56) References Cited

U.S. PATENT DOCUMENTS

| | | | | |
|---|---|---|---|---|
| 7,392,541 B2* | 6/2008 | Largman | ................. | G06F 21/53 726/17 |
| 7,926,029 B1* | 4/2011 | Stoyen | ................. | G06F 8/20 717/117 |
| 9,015,652 B2* | 4/2015 | Suenbuel | ................. | G06F 8/30 717/106 |
| 2003/0046061 A1* | 3/2003 | Preston | ................. | G06F 8/436 704/9 |
| 2010/0088671 A1* | 4/2010 | Rentsch | ................. | G06F 8/36 717/108 |

(Continued)

OTHER PUBLICATIONS

Title: Product configuration frameworks—a survey author: D Sabin publisghed on 1998; source: IEEE.*

(Continued)

*Primary Examiner* — Chameli Das
(74) *Attorney, Agent, or Firm* — DLA Piper LLP (US)

(57) ABSTRACT

A method of providing application-oriented software for a desired application-oriented functionality within a computer system includes transferring configuration data to the computer system, wherein the configuration data predefine a functionality of an application-oriented software to be created, using one or more program components from a plurality of program components stored locally within the computer system depending on the functionality predefined by the configuration data, creating the application-oriented software by the locally used program components depending on the functionality defined by the configuration data, and embedding the created application-oriented software in an operating environment in the computer system to provide the desired application-oriented functionality.

14 Claims, 1 Drawing Sheet

(56) References Cited

U.S. PATENT DOCUMENTS

| | | | |
|---|---|---|---|
| 2012/0124554 A1* | 5/2012 | Tam | H04L 67/02 |
| | | | 717/121 |
| 2012/0204173 A1 | 8/2012 | Liu | |
| 2013/0205278 A1* | 8/2013 | Hirsch | G06F 8/38 |
| | | | 717/121 |
| 2013/0332899 A1* | 12/2013 | Stewart | G06F 9/44505 |
| | | | 717/121 |
| 2014/0337816 A1* | 11/2014 | Chiluvuri | G06F 8/36 |
| | | | 717/107 |
| 2016/0224572 A1 | 8/2016 | Le et al. | |
| 2017/0124114 A1 | 5/2017 | Zhang et al. | |
| 2017/0228245 A1 | 8/2017 | Hardy et al. | |
| 2017/0235585 A1 | 8/2017 | Gupta et al. | |
| 2019/0318117 A1* | 10/2019 | Beecham | G06F 16/9024 |

OTHER PUBLICATIONS

Globus toolkit version 4: Software for service-oriented systems; author: I Foster published on 2006.*

Specification matching of software components, author: AM Zaremski et al, published on 1997 source: ACM.*

* cited by examiner

METHOD OF PROVIDING APPLICATION-ORIENTED SOFTWARE AND COMPUTER SYSTEM

TECHNICAL FIELD

This disclosure relates to a method of providing application-oriented software for a desired application-oriented functionality within a computer system and a computer system that provides a desired application-oriented functionality.

BACKGROUND

Generally, applications or application-oriented software for a desired application-oriented functionality within a computer system on which the application-oriented software has to be run, are created in a development environment, on a dedicated development computer system, for example. The created (built) software is then transferred to the computer system, where the software is to be run. For example, a file may be uploaded to the computer system comprising a copy (image) of the constructed software. Changes in configuration or of the functional range of the application-oriented software often result in changes of the complete software package, for example, of the image file that has to be transferred to the computer system. As a result, the complete software package has to be imported to the computer system by an upload to import changes in configuration or of the functional range of the software. In particular, when the bandwidth of a data connection for such an upload is limited, for example, in applications of the computer system as a so-called edge computer system at sites having an exposed location and/or severe environmental impacts, the traditional method disadvantageously results in a large data volume and maybe long lasting data transfers, wherein the data transfer is often error-prone or fails completely.

It could therefore be helpful to provide a method of providing application-oriented software for a desired application-oriented functionality and a computer system that provides a desired application-oriented functionality enabling a flexible configuration of the application-oriented software to provide variable functionalities and nonetheless overcome the disadvantages of traditional solutions stated above.

SUMMARY

We provide a method of providing application-oriented software for a desired application-oriented functionality within a computer system including transferring configuration data to the computer system, wherein the configuration data predefine a functionality of an application-oriented software to be created, using one or more program components from a plurality of program components stored locally within the computer system depending on the functionality predefined by the configuration data, creating the application-oriented software by the locally used program components depending on the functionality defined by the configuration data, and embedding the created application-oriented software in an operating environment in the computer system to provide the desired application-oriented functionality.

We also provide a computer system that provides a desired application-oriented functionality, wherein a plurality of program components that create an application-oriented software is locally stored within the computer system, the computer system includes a creating system that automatically creates the application-oriented software by using one or more locally used program components from the plurality of locally stored program components, the computer system includes an interface for data connection to a remote configuration server, the computer system is configured to obtain configuration data by the date connection from the configuration server that creates the application-oriented software, and the creating system is configured to create the application-oriented software by the one or more locally used program components depending on the obtained configuration data.

LIST OF REFERENCE NUMBERS

Figure 1:
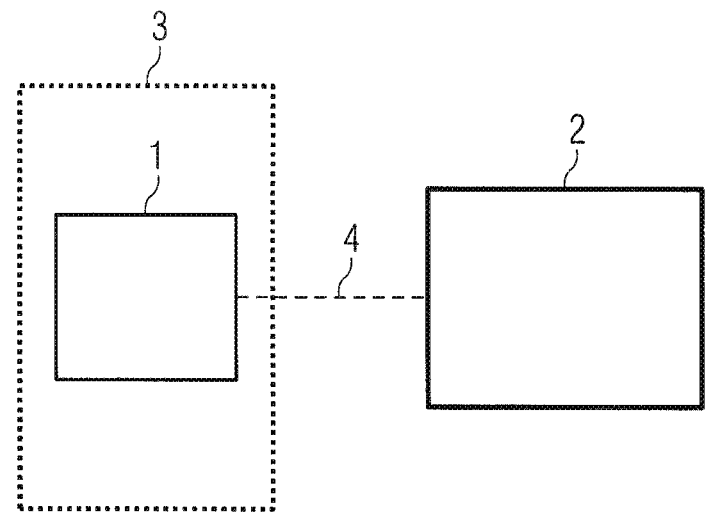
FIG. 1 shows a schematic diagram of a computer infrastructure including a computer system and a configuration server.

1 computer system
2 configuration server
3 system to be monitored
4 data connection
5 application-oriented software
6 configuration data
7 base operating system storage
8 application program file storage
9 creating system
10 base operating system
11 container
12 composition file
13 configuration data
14 operating environment
15a, 15b, 15c storage area

DETAILED DESCRIPTION

Our method is implemented to provide an application-oriented software for a desired application-oriented functionality within a computer system. Thus, configuration data are transferred to the computer system, wherein the configuration data predefine a functionality or configuration of an application-oriented software to be created. In addition, one or more program components from a plurality of program components that are stored locally within the computer system are used depending on the functionality or configuration predefined by the configuration data. By the locally retrieved program components, the application-oriented software is created depending on the functionality or configuration specified by the configuration data. Finally, the created application-oriented software is embedded in an operating environment in the computer system that provides a desired application-oriented functionality.

As opposed to traditional solutions, such a method offers the advantage that an application-oriented software for a desired application-oriented functionality may be created within a computer system from program components (exclusively or completely) locally stored and available within the computer system. Configuration data transferred to the computer system may be used by a creating system, for example, to generate the desired software within the computer system in an automated way. The configuration data may predefine a desired configuration or a desired functional range/functionality of an application-oriented software to be created. Then, by the configuration data, necessary, required or appropriate program components from the plurality of program components locally stored within the computer system may be used and assembled to the application-oriented software.

The method may be implemented in a way that any program components required to create the application-oriented software are advantageously stored locally within the computer system. This way, there is no need for program components uploaded to the computer system by a data connection to a remote background system (for example, development computer system). Thus, only configuration data has to be transferred to the computer system to predefine or control assembly of the required programming components to create the final software in a controlled and automated way.

This way, our method has the advantage that an application-oriented software may be built in the computer system itself in a flexible and variable way without having to upload software components to the computer system by an external data connection, in particular program components of the software having higher data volumes (for example, in the range of several gigabytes). Only configuration data has to be transferred to the computer system, wherein the configuration data is of a comparatively small size (for example, in the range of kilobytes or megabytes). Such a transfer may be performed in a fast and simple way even with a very limited bandwidth. In addition, to create the application-oriented software, no permanent connection between the computer system and the background system is required for data transfer. Only configuration data has to be transferred to the computer system by a short-term (temporary) data connection. Once the configuration data has been transferred completely, creating the application-oriented software within the computer system may be performed automatically without any further data connection to a remote background system. Thus, the method is very advantageous, in particular, for so-called edge computing applications.

In a variety of implementations of the method, the configuration data may comprise generally predefined instructions, definitions, rules, configurations, or a combination thereof, that predefine the usage and assembly of program components which are stored locally within the computer system to create the application-oriented software. In particular, configuration data may include which functionalities the software to be created should comprise. Alternatively or complementarily, actual specifications regarding the required program components may be stored in the configuration data, too. Configuration data may comprise one or more key/value pairs that predefine the program components to be locally retrieved within the computer system to create the application-oriented software. For example, such key-value pairs may relate to a determined program stack that defines the program components to be used or respective prepared program components bundles. Alternatively or complementarily, the configuration data may comprise one or more key/value pairs that predefine a configuration of the application-oriented software. Such a configuration may comprise a configuration of network interfaces, an assignment of IP addresses, user data, for example.

Configuration data may exclusively comprise non-executable data, in particular no executable program code or no executable command code, not to mention executable program files of the application-oriented software. Compared to traditional solutions, this offers the significant advantage that no program code has to be transferred to the computer system from outside (an external source) as a component of the application-oriented software to finally create the application-oriented software in the computer system. Rather, as described above, the method is advantageously implemented such that any executable program components required to create the software, in particular executable files, scripts, command codes, machine codes and the like are completely stored locally within the computer system.

This way, as opposed to traditional solutions, our method is configured in a very safe way since no executable program code is transferred to the computer system that may be manipulated. Insofar that no manipulations at the program code or command code of the finally created application-oriented software may be performed from outside (an external source), by implementing malicious code, for example. Worst-case, the configuration data is chosen in a way that creation of the desired software functionality fails or is canceled. An integration of additional or changed executable program code in the software to be created by configuration data is thus not possible.

Thus, any functionalities or executable program code or command code are hereby only stored locally within the computer system. This way it may be predefined, during an initial setup of the computer system, for example, which functionalities of an application-oriented software that has to be created are permitted or possible in which functional range. The method thus provides significant advantages, in particular for safety-critical applications compared to traditional solutions.

Configuration data may, for example, be summarized in a configuration file transferred to the computer system. Such a configuration file may be implemented as a text file, for example. The text file may be created in a predetermined markup language such as XML and YAML, for example. Transfer of the configuration data to the computer system may, for example, be performed by a package management system, for example, the so-called RPM package manager or the like.

A base operating system and one or more application program files may be used as program components to create the application-oriented software. These are only stored locally within the computer system. The base operating system and one or more application program files are assembled in an automated way to create the application-oriented software. The base operating system may be a Linux core, for example. The one or more application program file(s) may provide the actual application-oriented functionalities of the software to be created. According to a desired use case, predetermined program components may be included. The application program files may be prepared as container files, for example. The base operating system and/or the one or more application program files may be stored as image files in the computer system. Storage and management of the application program files as container files may be performed according to a container management system.

A created application-oriented software may comprise one or more software packages or one or more software files including the base operating system and the one or more application program file(s). The overall complex may be created in a creating system, for example, in the building software provided hereto, within the computer system in an automated way. The software created as a result may be provided as one or more image file(s). These may be embedded in an operating environment in the computer system such that the application-oriented software is locally executed or installed and then executed from one or more image file(s) in the computer system.

The application-oriented software may be created as a virtual machine, wherein the virtual machine is executed locally within the computer system. In those examples, the application-oriented software may represent a complete virtual computer system including one or more desired functionalities. Due to virtualization, the computer system may thus be adapted to the desired functionality in a variable and flexible way. A virtual machine having been created in this way may easily be operated and managed within the computer system. Also, such a virtualization is advantageous regarding a secure execution of the created software.

Within the computer system, a plurality of program components that create an application-oriented software are locally stored. The computer system comprises a creating system that automatically creates the application-oriented software by one or more locally stored program components from a plurality of the locally stored program components. In addition, the computer system comprises an interface for a data connection to a remote configuration server. The computer system is configured to obtain configuration data from the configuration server by the data connection to create the application-oriented software. The creating system is configured to generate the application-oriented software by the one or more locally used program components depending on the obtained configuration data.

In addition, such a computer system includes in the context of the method described above the advantages stated. The computer system may be advantageously configured in a way that any program components required to create the application-oriented software are stored locally in the computer system. This means, that the application-oriented software may be constructed exclusively from program components prepared in the computer system without having to load one or more program components to the computer system by a data connection to a remote server (for example, data server or configuration server).

The creating system may be configured such that creating the application-oriented software is performed automatically by using the configuration data loaded to the computer system. In particular, the creating system may be configured such that it locally leverages one or more program components in the computer system and assembles the locally retrieved program components to the application-oriented software by predefined instructions, definitions, rules, configurations or a combination thereof included in the configuration data (e.g., as key/value pairs). The program components and the configuration data may be of such a kind that a program code or a command code of the created application-oriented software, in particular, an executable program code or an executable command code, is exclusively assembled or built by using local program components. In this example, the configuration data comprise only non-executable data, and no executable program code or executable command code as part of the application-oriented software.

One or more base operating systems and one or more application program files may be stored within the computer system as program components that create the application-oriented software. The at least one base operating system may be a Linux core, for example. The one or more application program data may comprise predetermined program components that create the application-oriented software. The application program files may be prepared as container files. Apart from that, for the method described above reference is made to the description above.

The computer system may be an edge computer system. The edge computer system may, for example, be set up in a machine, a plant or an overall system and may be configured to monitor the machine, the plant or the overall system. For example, pre-processing of sensor data may be performed by the edge computer system that has been acquired by one or more sensors of the machine, the plant or the overall system.

The computer system is advantageously configured to perform a method according to the kind described above.

The computer system may, for example, be used in a computer infrastructure that in addition to the computer system comprises a remote configuration server. The configuration server contains the configuration data of the kind described above and may be linked to the computer system, at least temporarily, by a data connection to import the configuration data into the computer system. The computer infrastructure may, for example, comprise the computer system as an edge computer system, wherein the configuration server is a server within a data center. The edge computer system may be connected by the data connection at least temporarily to the data center. The data center may provide predefined cloud services, for example. The data connection may be set up or configured in a way that it is only established for importing the configuration data from the configuration server to the computer system, and is terminated or closed after transfer of the configuration data to the computer system is completed. Thus, in particular, in a small bandwidth, the data connection has not to be permanently established between the configuration server and the computer system. The configuration data are advantageously configured such that the data size thereof is quite small, and lies in the range of kilobytes or megabytes. This way, despite a low bandwidth of a data connection, a relatively fast transmission of configuration data between the configuration server and the computer system is possible. Hence, no larger data volumes have to be transferred via this data connection. As already described above, the computer system may rather be implemented in a way that any program components that create the application-oriented software are stored locally within the computer system. Accordingly, no program components have to be uploaded to the computer system from outside (external sources) by the data connection. This way a fast, flexible, and secure generation of application-oriented software by the computer system is possible.

In the following, our methods and systems will be described by an example with reference to several figures.

FIG. 1 shows a computer infrastructure comprising a computer system 1 set up within a system 3 to be monitored. The system 3 to be monitored may, for example, be a machine, plant, production system or the like to be monitored. The computer system 1 is set up as a so-called edge computer system, for example. The computer system 1 is configured to monitor the system 3, for example, in particular to collect, evaluate or the like sensor data of the system 3. In addition, the computer system 1 may be further configured to control system 3. A variety of possible applications are possible.

The computer system 1 connects to a remote configuration server 2 by the data connection 4. The data connection 4 may be established as a permanent data connection or alternatively as an occasionally (temporary) data connection. The data connection 4 transfers and exchanges data between the computer system 1 and the configuration server 2.

The configuration server 2 may be set up within a data center and provide predetermined services, in particular cloud services, to the computer system 1, for example. In particular, in applications of the computer system 1 as edge computer system, the computer system 1 may provide a computing performance for the system 3 to be monitored, while background performance is provided by the configuration server 2 or the data center.

To provide a desired application-oriented functionality within the computer system 1, a setup of an application-oriented software within the computer system 1 is required. Providing the application-oriented software within the computer system 1 is described in the following by FIG. 2.

Figure 2:
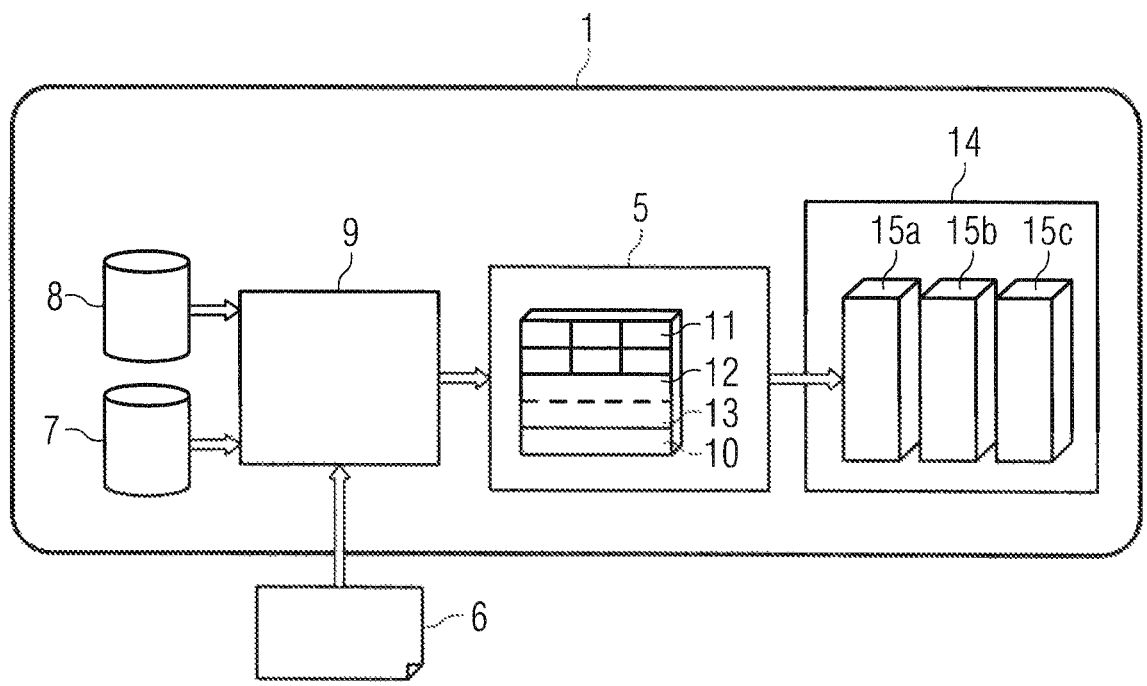
FIG. 2 shows a schematic diagram of a computer system as it may be used in FIG. 1.

FIG. 2 shows a schematic diagram of an example of the computer system 1, as it may be used in the computer infrastructure according to FIG. 1, for example.

In the following structural features or method steps of providing a desired application-oriented functionality within the computer system 1 are described.

The computer system 1 according to FIG. 2 comprises a base operating system storage 7 and an application program file storage 8. Within the base operating system storage 7, one or more base operating systems are stored. The base operating systems stored in storage 7 may be stored as so-called image files, for example. In the application program file storage 8 one or more application program files are stored. The application program files stored in storage 8 are, for example, stored as container files. The storage 8 may, for example, comprise an application program file directory including a link to the respective application program files. Management and structure of application program files may be provided by a container management, for example.

Program components (base operating system and application program files) stored in the storages 7 and 8, are thus stored completely and exclusively locally in the computer system 1. From program components within the storage 7 and 8, an application-oriented software may be created depending on the desired functionality in a variable and flexible way. Hereto, the program components stored in the storages 7 and 8 provide respective variable functionalities. To generate an application-oriented software, the computer system 1 comprises a creating system 9. The creating system 9 comprises, for example, a building software to construct (build) an application-oriented software 5 from selected program components from the plurality of program components stored in the storages 7 and 8. The creating system 9 is configured such that creation of the application-oriented software 4 is automatically executed.

To create the application-oriented software 5, first, configuration data 6 are transferred to the computer system 1. Such a transfer may, for example, be performed by a data connection 4 between the computer system 1 and a configuration server 2 according to FIG. 1. The configuration data 6 may, for example, be provided as a text file in a dedicated markup language, as XML or the YAML, for example. The configuration data 6 comprise, for example, a plurality of key/value pairs that define a desired functionality of an application-oriented software 5 to be created. The key/value pairs within the configuration data 6 predefine the program components that have to be retrieved locally from storages 7 and 8 within the computer system 1 to create the respective application-oriented software 5. In addition, the key/value pairs may predefine a configuration of the application-oriented software 5 to be created within the configuration data 6 (this may be the same key/value pairs or different key/value pairs). As a result, the configuration data 6 may comprise specifications relating to the program components to be used on the one hand, on the other hand, specifications about the configuration of the software 5 which has to be finally generated. This kind of specifications may, for example, be predetermined parameters and respective values to define the required components of the software 5 as, for example, interfaces, network parameters, user data or the like.

Once the configuration data 6 has been transferred to the computer system 1, it may be read and interpreted in the creating system 9. Hereto, a parser may be implemented in the creating system 9, for example, which interprets the text file written in the markup language, which comprises the configuration data 6. Thus, the creating system 9 automatically detects which program components from the plurality of program components stored in the storages 7 and 8 have to be used to create the application-oriented software 5. The required program components may be automatically loaded from the storages 7 and 8 by the creating system 9 and may be assembled depending on the configuration data 6. For example, the configuration data 6 predefine a determined software stack or program stack of required program components for implementing a desired functionality. Using this information, the creating system 9 assembles the required program components.

According to the constellation in FIG. 2, the configuration data 6 includes no executable data. Any executable program code for building the application oriented software 5 is predefined by the program components locally stored in the storages 7 and 8 in the computer system 1. This way, the creation of the application oriented software 5 according to FIG. 2 is especially secure since no executable program code may be imported from outside (an external source) into the computer system 1 by the configuration data 6. This way it is prevented that to create the application-oriented software 5, possibly manipulated program code (malicious code) is introduced into the computer system 1 by the configuration data 6. Rather, program functionality of the application-oriented software 5 is predefined by the program components prestored in the storages 7 and 8. Various application-oriented programs 5 may thus be assembled from a plurality of program components stored in the storages 7 and 8. This way, a flexible but also secure construction of application-oriented software 5 is ensured.

As any program components that create the application-oriented software 5 are pre-stored within the storages 7 and 8 in the computer system 1, and only configuration data 6 are to be imported into the computer system 1 to assemble the program components in a predefined and controlled way, the configuration data 6 and the created software 5 may have a very small data size (file size) compared to program components. For example, configuration data may have a size of about 500 kB up to about 1 MB, while the program components stored in the storages 7 and 8 or the finally created application-oriented software 5 may have some gigabytes, for example, in total 6 GB.

An advantage of the computer system 1 and the method of creating the application-oriented software 5 according to FIG. 2 is thus that no larger amount of data has to be transferred between the computer system 1 and a remote computer system, for example, the configuration server 2 according to FIG. 1, by using a data connection. Rather, only the configuration data 6 have to be imported into the computer system 1 by an (at least temporarily) established data connection 4 (see FIG. 1). Hereto, the data connection 4 may comprise a low bandwidth, as the data volume of the configuration data 6, as described above, is very small. This way, depending on the desired functionality, an application-oriented software 5 may be flexibly created by locally stored program components in an automated way within the computer system 1 by using the creating system 9 depending on the configuration data 6, without having to transfer a high data volume of program components to the computer system 1 (upload). In addition, the method described above in relation to FIG. 2 is very safe. In particular, in a computer system at extreme sites of usage, for example, in an exposed location, where the computer system 1 is prone to severe environmental impacts, the method described above is advantageous.

As a result of an assembly of predetermined program components depending on the configuration data 6, the creating system 9 finally provides the software 5. According to FIG. 2, the software 5 comprises data from a plurality of application program files that may, for example, be embedded by way of containers 11. Additionally, the software 5 of the example according to the FIG. 2 comprises a composition file 12, configuration data 13, and a base operating system 10. The container 11 has been obtained from storage 8, the base operating system 10 has been obtained from storage 7. The composition file 12 has been automatically created during generation of software 5 and may be a text file in a predetermined markup language. The composition file 12 defines how the single containers 11 are associated and controlled for providing the desired functionality, for example. The composition file 12 may comprise a part of the configuration data 6, for example. Another part of the configuration data 6 may be included in the further configuration data 13. Here network parameters, network interfaces, user data, virtual drives, and so on may be defined. The containers 11 form a container system together with the composition file 12 to provide any desired applications controlled by the further configuration data 13 and the base operating system 10 (as base structure of the software 5). The created software 5 may be an image file (for example, "ISO" or "QCOW2"), for example. The created software 5 may finally be embedded in an operating environment 14 within the computer system 1. The operating environment 14 provides a physical hardware including a storage, and a monitoring and control software (for example, a hypervisor), for example. In addition, in the example according to FIG. 2, in total three storage areas 15a to 15c are set up within the operating environment 14, in which the created software 5 may be stored or installed, respectively. The software 5 may be created as a virtual machine. It may be stored or installed in one of the storage areas 15a to 15c, respectively, so that the virtual machine may be executed as executable software within the operating environment 14. This way, an application-oriented software 5 may be created in the computer system 1 depending on the desired functionality.

Alternatively, program components within the storage 8 may be stored as application programs without using any container management of the kind described above. In this example, the application programs are assembled to software 5 in the creating system 9 from a base operating system obtained from the storage 7, wherein no composition file 12 is required, for example. Rather, the single application programs may be assembled together with the base operating system and the respective configuration files 13 in a software file 5 (for example, image file).

Alternatively, the created software 5 may also include a plurality of files.

Further alternatively, already prestored, assembled software packages (bundles) may be stored in the storages 7 or 8 that provide respective functionalities of a software 5. In this example, the creating system 9 may be implemented in a way that by the configuration data 6, an appropriate software package may be selected from the storages 7 or 8 and is provided as software 5, being complemented by configuration data 13, if required. It is also possible to provide only one storage 7 or 8, wherein the respective program components are stored.

The invention claimed is:

1. A method of providing application-oriented software for a desired application-oriented functionality within a computer system comprising:
   transferring configuration data to the computer system, wherein the configuration data predefine an assembly of required program components to create the application-oriented software and wherein the configuration data comprise one or more key/value pairs that predefine the program components that have to be locally used within the computer system to create the application-oriented software,
   locally retrieving one or more program components from a plurality of various program components stored locally within the computer system depending on the assembly predefined by the configuration data, wherein the program components stored locally within the computer system provide variable functionalities,
   creating the application-oriented software by assembling the one or more locally retrieved program components to the application-oriented software depending on the assembly predefined by the configuration data, and
   embedding the created application-oriented software in an operating environment in the computer system to provide the desired application-oriented functionality,
   wherein as program components to create the application-oriented software, a base operating system and one or more application program files are used, only stored locally within the computer system, wherein the base operating system and the application program files are assembled automatically to create the application oriented software, and
   wherein the application program files are prepared as container files.

2. The method according to claim 1, wherein the configuration data comprise one or more key/value pairs that predefine a configuration of the application-oriented software.

3. The method according to claim 2, wherein the configuration data comprise only non-executable data.

4. The method according to claim 2, wherein as program components to create the application-oriented software, a base operating system and one or more application program files are used, only stored locally within the computer system, wherein the base operating system and the application program files are assembled automatically to create the application oriented software.

5. The method according to claim 2, wherein the application-oriented software is created as a virtual machine, and the virtual machine is locally executed within the computer system.

6. The method according to claim 1, wherein the configuration data comprise only non-executable data.

7. The method according to claim 6, wherein as program components to create the application-oriented software, a base operating system and one or more application program files are used, only stored locally within the computer system, wherein the base operating system and the application program files are assembled automatically to create the application oriented software.

8. The method according to claim 6, wherein the application-oriented software is created as a virtual machine, and the virtual machine is locally executed within the computer system.

9. The method according to claim 1, wherein the application-oriented software is created as a virtual machine, and the virtual machine is locally executed within the computer system.

10. A computer system that provides a desired application-oriented functionality,
wherein a plurality of various program components is locally stored within the computer system to create an application-oriented software,
the computer system comprises a creating system that automatically creates the application-oriented software by locally retrieving one or more program components from the plurality of various program components,
the computer system comprises an interface for data connection to a remote configuration server,
the computer system is configured to obtain configuration data by the data connection from the remote configuration server, wherein the configuration data predefine an assembly of required program components to create the application-oriented software and wherein the configuration data comprise one or more key/value pairs that predefine the program components that have to be locally used within the computer system to create the application-oriented software, and
the creating system is configured to create the application-oriented software by assembling the one or more locally retrieved program components to the application-oriented software depending on the assembly predefined by the configuration data,
wherein as program components to create the application-oriented software, a base operating system and one or more application program files are used, only stored locally within the computer system, wherein the base operating system and the application program files are assembled automatically to create the application oriented software, and
wherein the application program files are prepared as container files.

11. The computer system according to claim 10, wherein one or more base operating systems and one or more application program files are stored as program components to create the application-oriented software within the computer system.

12. The computer system according to claim 10, wherein the creating system is configured to create the application-oriented software as a virtual machine.

13. The computer system according to claim 10, wherein the computer system is an edge computer system and configured to perform a method of
transferring configuration data to the computer system, wherein the configuration data predefine an assembly of required program components to create the application-oriented software and wherein the configuration data comprise one or more key/value pairs that predefine the program components that have to be locally used within the computer system to create the application-oriented software,
locally retrieving one or more program components from a plurality of various program components stored locally within the computer system depending on the assembly predefined by the configuration data, wherein the program components store locally within the computer system provide variable functionalities,
creating the application-oriented software by assembling the one or more locally retrieved program components to the application-oriented software depending on the assembly predefined by the configuration data, and
embedding the created application-oriented software in an operating environment in the computer system to provide the desired application-oriented functionality,
wherein as program components to create the application-oriented software, a base operating system and one or more application program files are used, only stored locally within the computer system, wherein the base operating system and the application program files are assembled automatically to create the application oriented software, and
wherein the application program files are prepared as container files.

14. A computer infrastructure comprising the computer system according to claim 10 and a remote configuration server, wherein the remote configuration server stores the configuration data and is configured to be connected to the computer system by a data connection, at least temporarily, to import the configuration data into the computer system.

* * * * *